(12) United States Patent
Uchida et al.

(10) Patent No.: US 7,211,622 B2
(45) Date of Patent: May 1, 2007

(54) AQUEOUS RESIN COMPOSITION AND ITS USES

(75) Inventors: Masaya Uchida, Osaka (JP); Kanji Nakao, Suita (JP); Yoshiyuki Yokota, Suita (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 10/840,346

(22) Filed: May 7, 2004

(65) Prior Publication Data

US 2004/0241484 A1    Dec. 2, 2004

(30) Foreign Application Priority Data

May 28, 2003   (JP)   .............................. 2003-151098

(51) Int. Cl.
  *C08L 33/06*   (2006.01)
(52) U.S. Cl. ...................... 524/832; 524/827; 524/831; 524/833; 525/227; 525/228
(58) Field of Classification Search ................ 524/827, 524/831, 832, 833; 525/227, 228
  See application file for complete search history.

(56) References Cited

U.S. PATENT DOCUMENTS

| | | | |
|---|---|---|---|
| 5,021,469 A | 6/1991 | Langerbeins et al. | |
| 5,308,890 A | 5/1994 | Snyder | |
| 6,489,396 B2 * | 12/2002 | Nakamura et al. | ........... 525/117 |
| 6,686,413 B2 * | 2/2004 | Nakamura et al. | ........... 524/553 |

FOREIGN PATENT DOCUMENTS

| | | |
|---|---|---|
| EP | 1 184 396 | 3/2002 |
| JP | 62-205169 | 9/1987 |
| JP | 64-45472 | 2/1989 |
| JP | 2-233786 | 9/1990 |
| JP | 5-295275 | 11/1993 |
| JP | 7-41683 | 2/1995 |
| JP | 9-111154 | 4/1997 |
| JP | 2001-19721 | 1/2001 |
| JP | 2001-200181 | * 7/2001 |

* cited by examiner

*Primary Examiner*—Helen L. Pezzuto
(74) *Attorney, Agent, or Firm*—Roylance, Abrams, Berdo & Goodman, L.L.P.

(57) ABSTRACT

An object of the present invention is to provide an aqueous resin composition and its uses, wherein the aqueous resin composition combines the blocking resistance and the frost damage resistance and thereby can secure the durability over a long period of time even under circumstances where a severe temperature cycle is present. As a means of achieving this object, the aqueous resin composition according to the present invention is an aqueous resin composition comprising an acrylic resin emulsion and a crosslinking agent as essential components, with the aqueous resin composition being characterized in that, when a coating film is formed from the aqueous resin composition, the formed coating film exhibits an elongation ratio (E (%)) that satisfies a specific relational expression along with the glass transition temperature ($Tg^T$ (° C.)) of the acrylic resin in the emulsion.

19 Claims, No Drawings

AQUEOUS RESIN COMPOSITION AND ITS USES

BACKGROUND OF THE INVENTION

A. Technical Field

The present invention relates to an aqueous resin composition and its uses. More specifically, the present invention relates to an aqueous resin composition and its uses, wherein the aqueous resin composition can form such as a coating film excellent in both the blocking resistance and the frost damage resistance.

B. Background Art

Since the past, aqueous coatings prepared from water-soluble resins or water dispersion type resins (e.g. emulsions) have been applied in place of solvent-base coatings in order to avoid environmental problems caused by such as emission of organic solvents into the air. However, when compared with the solvent-base coatings, the aqueous coatings uses water as the medium and therefore have had problems of being inferior in such as driability, durability (e.g. water resistance, weather resistance) and finished appearance of coating films and further involving difficulty in enhancing the hardness of coating films.

In order to solve such problems, attempts are made to enhance the finished appearance and durability (e.g. water resistance) of coating films by such as combining different kinds of emulsions (e.g. refer to patent document 1) or adding specific crosslinking agents (e.g. refer to patent documents 2 and 3).

Generally, when a coating film is formed from a coating, there is a case where the appearance and durability of the formed coating film are spoiled by a phenomenon (which is called blocking behavior) such that the coating film and a layer contacting therewith stick together for the cause that the coating film undergoes pressure during its storage or use. For preventing such a blocking behavior, the coating film needs to be finished into a still harder film. On the other hand, in order to enhance the durability of the coating film during cycles between low and high temperatures, the flexibility is demanded to the coating film. Accordingly, for obtaining the durability of the coating film over a long period of time regardless of rapid temperature variation, it is important to combine the blocking resistance and what is called frost damage resistance.

[Patent Document 1] JP-A-200181/2001 (Kokai)
[Patent Document 2] JP-A-019721/2001 (Kokai)
[Patent Document 3] JP-A-295275/1993 (Kokai)

However, both have trade-off relations with each other, and it is therefore difficult to combine both properties. Thus, it is the present state of arts that the combining of both properties has not come true yet.

SUMMARY OF THE INVENTION

A. Object of the Invention

The present invention has been made in consideration of the above problems and has an object to provide an aqueous resin composition and its uses, wherein the aqueous resin composition combines the blocking resistance and the frost damage resistance and can secure the durability over a long period of time even under circumstances where a severe temperature cycle is present.

B. Disclosure of the Invention

An aqueous resin composition according to the present invention is an aqueous resin composition comprising an acrylic resin emulsion and a crosslinking agent as essential components, with the aqueous resin composition being characterized in that, when a coating film is formed from the aqueous resin composition, the formed coating film exhibits an elongation ratio (E (%)) that satisfies, along with the glass transition temperature ($Tg^T$ (° C.)) of the acrylic resin in the emulsion, the following expression:

$$2 \times Tg^T + E > 200.$$

As to the above aqueous resin composition according to the present invention: it is possible that the coating film exhibits a blocking-resistant value ($\alpha$) of not less than 5.0 and a value ($\beta$) of not less than 60, wherein the value ($\beta$) is calculated from the frost damage resistance (M) of the coating film, the thermosoftening temperature (TMA) of a dried material of the aqueous resin composition, and the blocking-resistant value ($\alpha$) in accordance with the following expression:

$$TMA \cdot \alpha \cdot M/1000;$$

it is possible that the acrylic resin in the emulsion is a product obtained by polymerizing at least one acrylic polymerizable monomer selected from the group consisting of alkyl (meth)acrylates having 4 to 10 carbon atoms and cycloalkyl (meth)acrylates having 6 to 10 carbon atoms;

it is possible that the acrylic resin in the emulsion includes two or more acrylic resins, wherein at least two of the two or more acrylic resins have a glass transition temperature difference of not less than 30° C. between them;

it is possible that at least one of the at least two acrylic resins having the glass transition temperature difference between them has a glass transition temperature of not lower than 80° C.;

it is possible that the acrylic resin emulsion includes a multistep polymer emulsion obtained by carrying out emulsion polymerization of a monomer multistepwise in lots; and it is possible that the crosslinking agent includes an oxazoline-group-containing compound as an essential component.

Another aqueous resin composition according to the present invention is an aqueous resin composition comprising an acrylic resin emulsion and a crosslinking agent as essential components, with the aqueous resin composition being characterized in that: the acrylic resin in the emulsion includes two or more acrylic resins, wherein at least two of the two or more acrylic resins have a glass transition temperature difference of not less than 30° C. between them; and the crosslinking agent includes an oxazoline-group-containing compound as an essential component.

As to the above other aqueous resin composition according to the present invention, it is possible that at least one of the at least two acrylic resins having the glass transition temperature difference between them has a glass transition temperature of not lower than 80° C.

A coating film according to the present invention is formed from an aqueous resin composition including an acrylic resin emulsion and a crosslinking agent as essential components, with the coating film exhibiting a blocking-resistant value ($\alpha$) of not less than 5.0 and a value ($\beta$) of not less than 60, wherein the value ($\alpha$) is calculated from the frost damage resistance (M) of the coating film, the thermosoftening temperature (TMA) of a dried material of the aqueous resin composition, and the blocking-resistant value ($\alpha$) in accordance with the following expression:

$$TMA \cdot \alpha \cdot M/1000.$$

As to the above coating film according to the present invention, it is possible that, in this coating film, acrylic units are contained along with oxazoline groups and/or amide ester bond units.

A building material according to the present invention comprises a base material and the above coating film according to the present invention, wherein the base material has the coating film thereon.

These and other objects and the advantages of the present invention will be more fully apparent from the following detailed disclosure.

DETAILED DESCRIPTION OF THE INVENTION

Hereinafter, detailed descriptions are given about the aqueous resin composition according to the present invention and its uses. However, the scope of the present invention is not bound to these descriptions. And other than the following illustrations can also be carried out in the form of appropriate modifications of the following illustrations within the scope not departing from the spirit of the present invention.

[Aqueous Resin Composition]

As is aforementioned, the aqueous resin composition according to the present invention is the resin composition comprising the acrylic resin emulsion and the crosslinking agent as essential constitutional components. Hereinafter, first of all, detailed descriptions are given about these essential constitutional components and subsequently about other constitutional components and the aqueous resin composition.

(Acrylic Resin Emulsion)

The acrylic resin emulsion, which is an essential constitutional component of the aqueous resin composition according to the present invention, includes: emulsified particles of the acrylic resin; and an aqueous medium.

The acrylic resin in the present invention encompasses a methacrylic resin as well. As the case may be, the wording "(meth)acryl" is herein used as the generic wording for "acryl" and "methacryl".

The acrylic monomer, usable for the production of the acrylic resin emulsion in the aqueous resin composition according to the present invention, is free of especial limitation if the acrylic resin obtained by polymerizing this acrylic monomer can form the emulsified particles. Any of publicly known acrylic monomers can be used.

Examples of the acrylic monomer include at least one of:

alkyl (meth)acrylates having 1 to 20 carbon atoms, such as methyl (meth)acrylate, ethyl (meth)acrylate, n-butyl (meth)acrylate, isobutyl (meth)acrylate, t-butyl (meth)acrylate, 2-ethylhexyl (meth)acrylate, and tridecyl (meth)acrylate;

cycloalkyl (meth)acrylates having 4 to 20 carbon atoms, such as cyclohexyl (meth)acrylate, methylcyclohexyl (meth)acrylate, cyclododecyl (meth)acrylate, and t-butylcyclohexyl (meth)acrylate;

aralkyl (meth)acrylates having 3 to 20 carbon atoms, such as allyl (meth)acrylate and benzyl (meth)acrylate;

alkylcyclohexylalkyl esters of (meth)acrylic acid, such as 4-methylcyclohexylmethyl (meth)acrylate, 4-ethylcyclohexylmethyl (meth)acrylate, 4-methoxycyclohexylmethyl (meth)acrylate, 4-acetoxymethylcyclohexylmethyl (meth)acrylate, 3-methylcyclohexylmethyl (meth)acrylate, 3-ethylcyclohexylmethyl (meth)acrylate, 3-acetoxymethylcyclohexylmethyl (meth)acrylate, 3-hydroxymethylcyclohexylmethyl (meth)acrylate, 4-methylcyclohexylethyl (meth)acrylate, 3-methylcyclohexylethyl (meth)acrylate, 4-methylcyclohexypropyl (meth)acrylate, 3-methylcyclohexypropyl (meth)acrylate, 4-methylcyclohexybutyl (meth)acrylate, and 3-methylcyclohexybutyl (meth)acrylate;

epoxy-group-containing vinylic monomers, such as glycidyl (meth)acrylate;

hydroxyl-group-containing acrylic monomers, such as 2-hydroxyethyl (meth)acrylate, 2-hydroxypropyl (meth)acrylate, 4-hydroxybutyl (meth)acrylate, Placcel FA-1, Placcel FA-4, Placcel FM-1, Placcel FM-4 (these series of Placcel are produced by Daicel Chemical Industries, Ltd. and are addition products of ε-caprolactone to hydroxyalkyl (meth)acrylates), and (meth)acryloxypolyoxyalkylenes;

α,β-ethylenically unsaturated carboxylic acids or unsaturated carboxylic anhydrides, such as acrylic acid, methacrylic acid, maleic acid, maleic anhydride, itaconic acid, itaconic anhydride, crotonic acid, fumaric acid, and citraconic acid;

acid-group-containing (meth)acrylates, such as (meth)acryloxyethyl phosphate and (meth)acryloxyethylsulfonic acid;

salts (e.g. alkaline metal salts, ammonium salts, amine salts) of the unsaturated carboxylic acids and the acid-group-containing (meth)acrylates;

half esters between unsaturated carboxylic anhydrides (e.g. maleic anhydride) and linear or branched alcohols having 1 to 20 carbon atoms;

urethane-bond-containing urethane (meth)acrylate compounds which are such as reaction products between isocyanate-group-containing compounds and hydroxyalkyl (meth)acrylates;

(meth)acryl-group-containing silicone macromers such as (meth)acryl-group-containing organopolysiloxanes such as γ-(meth)acryloyloxypropyltrimethoxysilane, γ-(meth)acryloyloxypropyltriethoxysilane, and γ-(meth)acryloyloxypropylmethyldimethoxysilane;

basic unsaturated monomers, such as dimethylaminoethyl (meth)acrylate, diethylaminoethyl (meth)acrylate, dimethylaminoethyl(meth)acrylamide, and dimethylaminopropyl (meth)acrylamide;

unsaturated sulfonic acids, such as 2-sulfoethyl (meth)acrylate and its salts;

caprolactone-modified (meth)acrylic acids;

amino-group-containing (meth)acrylates, such as t-butylaminoethyl (meth)acrylate, t-butylaminopropyl (meth)acrylate, aziridinylethyl (meth)acrylate, pyrrolidinylethyl (meth)acrylate, and piperidinylethyl (meth)acrylate;

(meth)acrylamides, such as (meth)acrylamide, N-monomethyl(meth)acrylamide, N-monoethyl(meth)acrylamide, N,N-dimethyl(meth)acrylamide, N-methylol(meth)acrylamide, N-butoxy(meth)acrylamide, N-dimethylaminoethyl(meth)acrylamide, N-diethylaminoethyl(meth)acrylamide, N-dimethylaminopropyl(meth)acrylamide, and N-diethylaminopropyl(meth)acrylamide;

monomers having more than one polymerizable unsaturated bonds, such as polyethylene glycol di(meth)acrylate, ethylene glycol di(meth)acrylate, propylene glycol di(meth)acrylate, neopentyl glycol di(meth)acrylate, 1,6-hexanediol di(meth)acrylate, and triallyl cyanurate;

polymerizable monomers containing a piperidinic group photostable in such as polymerization, such as 4-(meth)acryloyloxy-2,2,6,6-tetramethylpiperidine, 4-(meth)acryloylamino-2,2,6,6-tetramethylpiperidine, 4-(meth)acryloyloxy-1,2,2,6,6-pentamethylpiperidine, 4-(meth)acryloyloxy-1-methoxy-2,2,6,6-tetramethylpiperidine, 4-cyano-4-(meth)acryloyloxy-2,2,6,6-tetramethylpiperidine, 1-(meth)

acryloyl-4-(meth)acryloylamino-2,2,6,6-tetramethylpiperidine, and 4-crotoylamino-2,2,6,6-tetramethylpiperidine; and ultraviolet-absorbent-group-containing polymerizable monomers, such as benzophenone type polymerizable monomers (e.g. 2-hydroxy-4-[3-(meth)acryloyloxy-2-hydroxypropoxy]benzophenone) and benzotriazole type polymerizable monomers (e.g. 2-[2'-hydroxy-5'-(methacryloyloxymethyl)phenyl]-2H-benzotriazole, 2-[2-hydroxy-5-(methacryloyloxyethyl)phenyl]-2H-1,2,3-benzotriazole, 2-[2'-hydroxy-5'-(methacryloyloxymethyl)phenyl]-5-cyano-2H-benzotriazole, 2-[2'-hydroxy-5'-(methacryloyloxymethyl)phenyl]-5-t-butyl-2H-benzotriazole).

Above all of the above-enumerated acrylic monomers, from the viewpoint of such as water resistance and weather resistance, the alkyl (meth)acrylates having 1 to 20 carbon atoms and the cycloalkyl (meth)acrylates having 4 to 20 carbon atoms are favorable, and the alkyl (meth)acrylates having 4 to 10 carbon atoms and the cycloalkyl (meth)acrylates having 6 to 10 carbon atoms are more favorable, and the alkyl (meth)acrylates having 4 to 6 carbon atoms and the cycloalkyl (meth)acrylates having 6 to 8 carbon atoms are still more favorable. In addition, it is favorable to further use the photostable-group-containing polymerizable monomers. Incidentally, these alkyl (meth)acrylates and cycloalkyl (meth)acrylates may be used in combination with the above acrylic monomers. However, it is the most favorable to use at least one member (preferably, at least two members) selected from the group consisting of the alkyl (meth)acrylates and the cycloalkyl (meth)acrylates. For example, the alkyl (meth)acrylates and/or the cycloalkyl (meth)acrylates are used favorably in an amount of 5 to 60 weight %, more favorably 10 to 50 weight %, still more favorably 20 to 40 weight %, relative to the total amount of the entire polymerizable monomers being used. In addition, in the case where the photostable-group-containing polymerizable monomers are used, they are made to be contained favorably in an amount of 0.1 to 10 weight %, more favorably 0.5 to 5 weight %, relative to the total amount of the entire polymerizable monomers being used.

Similarly, above all of the above-enumerated acrylic monomers, in point of having a functional group high-reactable with the crosslinking agent, it is favorable to use the acid-group-containing monomers such as: α,β-ethylenically unsaturated carboxylic acids or unsaturated carboxylic anhydrides; acid-group-containing (meth)acrylates; salts of these unsaturated carboxylic acids and acid-group-containing (meth)acrylates; and half esters between unsaturated carboxylic anhydrides and linear or branched alcohols having 1 to 20 carbon atoms; and it is more favorable to use: the α,β-ethylenically unsaturated carboxylic acids or unsaturated carboxylic anhydrides; and the acid-group-containing (meth)acrylates; and it is still more favorable to use the α,β-ethylenically unsaturated carboxylic acids or unsaturated carboxylic anhydrides. In the case where the acid-group-containing monomers are used, the amount thereof being used is favorably in the range of 0.1 to 10 weight %, more favorably 0.3 to 5 weight %, still more favorably 0.5 to 3 weight %, relative to the total amount of the entire polymerizable monomers being used.

Particularly, as to the acrylic resin emulsion used in the present invention, it is favorable that the acrylic resin in the emulsion includes two or more acrylic resins, wherein at least two of the two or more acrylic resins have a glass transition temperature difference of not less than 30° C. between them. Hereupon, the glass transition temperature (Tg (° C.)) refers to a value having been converted from Tg (K) calculated in accordance with Fox's equation shown by the equation (1) below. However, in the case where this Fox's equation is not applicable, a value actually measured by differential scanning calorimetry (DSC) of a coating film formed from the contained acrylic resin alone may be taken as the glass transition temperature (Tg (° C.)).

$$1/Tg = \sum_{i=1}^{n} (W_i/Tg_i) \qquad (1)$$

(wherein: $W_i$ represents a weight fraction (weight %) of each comonomer; and $Tg_i$ represents Tg [K: absolute temperature] of a homopolymer of each comonomer)

As is aforementioned, the aforementioned glass transition temperature difference is favorably not less than 30° C. However, it is more favorably not less than 35° C., still more favorably not less than 40° C., particularly favorably not less than 65° C., most favorably not less than 95° C. In the case where the aforementioned glass transition temperature difference is less than 30° C., there is a possibility that the elongation ratio of the coating film may be so low as to spoil the frost damage resistance.

Further as to the aforementioned glass transition temperature difference, at least one of the at least two acrylic resins having the above temperature difference between them has a glass transition temperature of not lower than 80° C. favorably for easily exercising or enhancing the blocking resistance. More specifically, at least one of the at least two acrylic resins having the above temperature difference between them has a glass transition temperature of favorably not lower than 80° C., more favorably not lower than 85° C., still more favorably not lower than 95° C., particularly favorably not lower than 105° C., most favorably not lower than 115° C., and at least one of the acrylic resins other than the above at least one acrylic resin has a glass transition temperature of favorably not higher than 50° C., more favorably not higher than 45° C., still more favorably not higher than 35° C., particularly favorably not higher than 20° C., most favorably not higher than 15° C.

In the case where the acrylic resin in the acrylic resin emulsion includes two or more acrylic resins wherein at least two of these two or more acrylic resins have the above glass transition temperature difference between them, it is favorable that, of the at least two acrylic resins having the above temperature difference between them, an acrylic resin having a higher glass transition temperature than the others is used in an amount of 10 to 80 weight %, more favorably 10 to 50 weight %, in terms of solid content relative to the entire acrylic resins in the acrylic resin emulsion.

Although not especially limited, the glass transition temperature ($Tg^T$ (° C.)) of the acrylic resin in the acrylic resin emulsion used in the present invention, that is, the apparent glass transition temperature in total of the acrylic resin in the emulsion, is favorably not lower than 10° C., more favorably not lower than 20° C., still more favorably not lower than 30° C. Hereupon, in the case where, as is aforementioned, the acrylic resin in the emulsion includes two or more acrylic resins, then the above glass transition temperature ($Tg^T$ (° C.)) is defined as a value determined from the following equation (2) when the glass transition temperatures (° C.) of those acrylic resins are represented by $Tg^1, Tg^2, \ldots, Tg^n$ and when the contents (weight fractions: weight % (in terms of solid content)) of those acrylic resins relative to the entire acrylic resins are represented by $X^1, X^2, \ldots, X^n$.

$$1/(Tg^T - 273) = \sum_{i=1}^{n} [x^i/(Tg^i - 273)] \quad (2)$$

(wherein: $X^i$ represents a weight fraction of each acrylic resin; and $Tg^i$ represents Tg (° C.) of each acrylic resin)

The increase of the value of the above glass transition temperature ($Tg^T$ (° C.)) indicates that a coating film having a higher hardness can be formed, and further that a coating film which is more excellent in the blocking resistance can be obtained. As to the aqueous resin composition according to the present invention, it is important that, as is mentioned below, a value, which is determined by substituting the above glass transition temperature ($Tg^T$ (° C.)) in a specific expression along with the elongation ratio (E (%)) of the resultant coating film, satisfies a specific range.

The acrylic resin emulsion can be produced by polymerization methods publicly known in the corresponding field, for example, emulsion polymerization in an aqueous medium. Incidentally, in the case where the polymerization is carried out, additives publicly known in the corresponding field, for example, such as emulsifiers and polymerization initiators, may be used.

The aqueous medium is free of especial limitation if it is water or a mixed solution of water and a hydrophilic solvent. Examples of the mixed solution include mixed solutions of water and such as methanol, ethanol, propanol, isopropanol, butanol, tertiary butanol, ethylene glycol, ethylene glycol monomethyl ether, ethylene glycol monobutyl ether, diethylene glycol, acetone, and methyl ethyl ketone. These aqueous mediums may be used either alone respectively or in combinations with each other.

The emulsifier is not especially limited. For example, there can be used such as anionic emulsifiers, nonionic emulsifiers, cationic emulsifiers, amphoteric emulsifiers, and high-molecular emulsifiers. The emulsifiers may be used either alone respectively or in combinations with each other.

Examples of the anionic emulsifiers include: alkyl sulfate salts, such as ammonium dodecyl sulfate and sodium dodecyl sulfate; alkylsulfonate salts, such as ammonium dodecylsulfonate and sodium dodecylsulfonate; alkylarylsulfonate salts, such as ammonium dodecylbenzenesulfonate and sodium dodecylnaphthalenesulfonate; polyoxyethylene alkyl sulfate salts; polyoxyethylene alkylaryl sulfate salts; dialkylsulfosuccinic acid salts; arylsulfonic acid-formalin condensation products; and fatty acid salts, such as ammonium laurylate and sodium stearylate.

Examples of the nonionic emulsifiers include: polyoxyethylene alkyl ethers; polyoxyethylene alkyl aryl ethers; condensation products between polyethylene glycol and polypropylene glycol; sorbitan fatty acid esters; polyoxyethylene sorbitan fatty acid esters; fatty acid monoglyceride; polyamides; and condensation products between ethylene oxide and aliphatic amines.

Examples of the cationic emulsifiers include alkylammonium salts such as dodecylammonium chloride.

Examples of the amphoteric emulsifiers include betaine ester type emulsifiers.

Examples of the high-molecular emulsifiers include: poly((meth)acrylic acid) salts, such as sodium polyacrylate; poly(vinyl alcohol), poly(vinylpyrrolidone); poly(hydroxyalkyl (meth)acrylates), such as poly(hydroxyethyl acrylate); or copolymers of at least one, as a comonomer, of polymerizable monomers forming these polymers.

Above all, particularly in the case of regarding the water resistance as important, it is favorable to use emulsifiers having polymerizable groups. Examples of anionic emulsifiers having polymerizable groups include bis(polyoxyethylene polycyclic phenyl ether)-methacrylated sulfuric acid ester salts, propenyl-alkylsulfosuccinic acid ester salts, polyoxyethylene (meth)acrylate sulfate salts, polyoxyethylene (meth)acrylate phosphonate salts, polyoxyethylene alkyl propenyl phenyl ether sulfate salts, and allyl-group-containing sulfuric acid esters (or their salts) (e.g. sulfuric acid ester salts of allyloxymethylalkyloxypolyoxyethylenes, sulfuric acid ester salts of allyloxymethylnonylphenoxyethylhydroxypolyoxyethylene). Examples of nonionic emulsifiers having polymerizable groups include polyoxyethylene alkyl propenyl phenyl ethers and allyloxymethylnonylphenoxyethylhydroxypolyoxyethylene.

Though not especially limited, the amount of the emulsifier being used is favorably in the range of 0.5 to 5 weight %, more favorably 1 to 3 weight %, relative to the total amount of the entire polymerizable monomers being used, from the viewpoint of reducing neither the water resistance of the coating film nor the polymerization stability.

The polymerization initiator is not especially limited. Examples thereof include: azo compounds, such as 2,2'-azobis(2-amidinopropane) dihydrochloride; persulfates, such as potassium persulfate and ammonium persulfate; and peroxides, such as hydrogen peroxide. The polymerization initiators may be used either alone respectively or in combinations with each other. Though not especially limited, the amount of the polymerization initiator being used is favorably in the range of 0.05 to 1 weight %, more favorably 0.1 to 0.5 weight %, relative to the total amount of the entire polymerizable monomers being used, in consideration that, if the polymerization rate is slow, then an unreacted polymerizable monomer remains, and that the water resistance of the coating film being formed should not be low. The method for adding the polymerization initiator can be selected appropriately from among such as lump addition, divisional addition, and continuous dropwise addition.

Incidentally, when the emulsion polymerization is carried out, for example, reducing agents (e.g. sodium hydrogensulfite) and transition metal salts (e.g. ferrous sulfate) may be added in order to promote the decomposition of the polymerization initiator. Also, if necessary, publicly known additives (e.g. pH buffers, chelating agents, chain transfer agents, coalescent agents) may be added.

Conditions of the polymerization (e.g. emulsion polymerization), namely, such as polymerization temperature, polymerization duration, stirring speed, and atmosphere, are not especially limited. They can be set appropriately for such as type of reactor and scale. Specifically, as to the polymerization temperature, it will do if it is determined with consideration given to the types of the polymerization initiator and polymerizable monomer being used. It is favorably in the range of 40 to 95° C. As to the polymerization duration, the shorter one is industrially easier. However, taking the polymerization rate and the safety into consideration, the polymerization duration is favorably in the range of 2 to 8 hours. As to the atmosphere during the polymerization, it is general to carry out the polymerization under an atmosphere of an inert gas (e.g. nitrogen) in order to enhance the efficiency of the polymerization initiator.

In the present invention, as to the acrylic resin emulsion, for example, its solid content (nonvolatile content) is properly in the range of 10 to 90 weight %, more properly 10 to 60 weight %, still more properly 30 to 60 weight %.

In the case where the acrylic resin in the acrylic resin emulsion includes two or more acrylic resins, the acrylic resin emulsion can be prepared by mixing with conventional stirrers in the usual temperature range of not higher than the production temperatures of the acrylic resins. For example, after the emulsion polymerization to give either one of the acrylic resins has been completed, the acrylic resin emulsion can be prepared by adding an emulsion of the other acrylic resin (as obtained separately by polymerization) to a reactor (as used for the preceding emulsion polymerization) and then stirring them together in the reactor. In addition, the acrylic resin emulsion may be prepared by multistep polymerization of polymerizing the monomer multistepwise in lots. For example, there can be cited a process including the steps of: polymerizing a monomer component of either one of the acrylic resins by publicly known methods; and then, in the presence of the resultant polymer component, carrying out a second-step polymerization (or a polymerization after it) of a monomer component of the other acrylic resin (e.g. refer to JP-B-019059/1994 (Kokoku)). Incidentally, it is proper to carry out the second-step polymerization (or a polymerization after it) after having polymerized not less than 80 weight %, favorably not less than 90 weight %, of the monomer component in the first step.

(Crosslinking Agent)

The crosslinking agent in the present invention has a function such that, in the drying process of the aqueous resin composition, reactive groups contained in a compound included in the crosslinking agent produce a network structure to thus crosslink the composition. Any compound can be used without especial limitation if it is a compound which can function in the above way. Examples thereof include compounds having more than one reactive group, and they may be either compounds having more than one reactive group per molecule or compounds which have repeating units deriving from monomers having at least one reactive group per molecule (i.e. polymers or copolymers). In the case where the crosslinking agent is the polymer or copolymer, the crosslinking agent can, for example, be produced by publicly known methods such as emulsion polymerization or suspension polymerization of such as vinyl resins having the reactive group or of such as vinyl resins with compounds having the reactive group. Incidentally, the crosslinking agent may be in a state dissolved in water and/or an organic solvent, or in the form of particles, or in a state dispersed in an aqueous solvent.

Examples of the crosslinking agent include publicly known various compounds containing reactive groups which can exercise the crosslinkability. Examples of the above reactive groups include the following various ones: a hydroxyl group; acid functional groups, such as a carboxyl group, a sulfonic acid group, and a phosphoric acid group; an epoxy group; a hydrolyzable silyl group; a silanol group; an active carbonyl group; an oxazoline group; and an isocyanate group. Above all, the crosslinking agent favorably includes an oxazoline-group-containing compound as an essential component. In the case where the oxazoline-group-containing compound is used as the crosslinking agent, emulsions of resins obtained from monomers represented by the α,β-ethylenically unsaturated carboxylic acids such as (meth)acrylic acid are favorable as the aforementioned acrylic resin emulsion in that they can easily run their reactions with the crosslinking agent.

Specific examples of the crosslinking agent include the following:

hydroxyl-group-containing compounds obtained from such as acrylic polyol resins, polyester resins, polyether resins (e.g. polyethylene ether, polypropylene ether), epoxy resins, urethane resins, and acrylic urethane resins, for instance, 2-hydroxyethyl (meth)acrylate, 2-hydroxypropyl (meth)acrylate, 4-hydroxybutyl (meth)acrylate, methyl(a-hydroxymethyl) acrylate, caprolactone-modified hydroxyalkyl (meth)acrylates (Placcel F series, produced by Daicel Chemical Industries, Ltd.), and 4-hydroxymethylcyclohexylmethyl (meth)acrylate;

carboxyl-group-containing compounds, such as: carboxyl-group-containing polyesters and polycarboxylic acids, obtained by condensation polymerization between unsaturated polybasic acids (typified by such as maleic anhydride, fumaric acid, citraconic acid and itaconic acid) or saturated polybasic acids (typified by such as phthalic anhydride, isophthalic acid, terephthalic acid, orthophthalic acid, naphthalenedicarboxylic acid, tetrahydrophthalic anhydride, hexahydrophthalic anhydride, and succinic acid) and polyhydric alcohol components (typified by such as ethylene glycol, propylene glycol, 1,3-propanediol, 1,4-butanediol, 1,3-butanediol, 1,5-pentanediol, 1,6-hexanediol glycol, diethylene glycol, triethylene glycol, 1,4-cyclohexanedimethanol, polyethylene glycol, polypropylene glycol, and polytetramethylene glycol); acrylic acid, methacrylic acid, maleic acid, fumaric acid, itaconic acid, maleic anhydride, monomethyl maleate, vinylbenzoic acid, oxalic monohydroxyethyl (meth)acrylate, diethyl maleate, dimethyl fumarate, carboxyl-group-terminated caprolactone-modified acrylates (Placcel FA series, produced by Daicel Chemical Industries, Ltd.), carboxyl-group-terminated caprolactone-modified methacrylates (Placcel FMA series, produced by Daicel Chemical Industries, Ltd.); and metal salts and amine salts of the carboxyl-group-containing compounds (e.g. sodium acrylate, sodium methacrylate);

sulfonic-acid-group-containing compounds obtained from such as vinylsulfonic acid, styrenesulfonic acid, sulfoethyl (meth)acrylate, and 3-allyloxy-2-hydroxypropanesulfonic acid;

phosphate-ester-containing compounds obtained from such as 2-(meth)acryloyloxyethyl acid phosphate and 2-(meth)acryloyloxypropyl acid phosphate;

hydrazino-group-containing compounds obtained from such as dicarboxylic dihydrazides having 2 to 10 carbon atoms (particularly, 4 to 6 carbon atoms) (e.g. sulfuric dihydrazide, malonic dihydrazide, succinic dihydrazide, glutaric dihydrazide, adipic dihydrazide, sebacic dihydrazide, maleic dihydrazide, fumaric dihydrazide, itaconic dihydrazide), aliphatic water-soluble dihydrazines having 2 to 4 carbon atoms (e.g. ethylene-1,2-dihydrazine, propylene-1,3-dihydrazine, butylene-1,4-dihydrazine);

thiol-group-containing compounds, such as triazine thiol;

epoxy-group-containing compounds obtained from such as: bisphenol A type epoxy resin, bisphenol F type epoxy resin, phenol novolac type epoxy resin, cresol novolac type epoxy resin, glycidylamine type epoxy resin, alicyclic epoxy compounds, hydrogenated bisphenol A type epoxy resin; and glycidyl (meth)acrylate, α-methylglycidyl acrylate, 3,4-epoxycyclohexylmethyl acrylate (CYCLOMER A200, produced by Daicel Chemical Industries, Ltd.), α-methylglycidyl methacrylate (M-GMA, produced by Daicel Chemical Industries, Ltd.), and 3,4-epoxycyclohexylmethyl methacrylate (CYCLOMER M100, produced by Daicel Chemical Industries, Ltd.);

metal chelate compounds, such as aluminum chelates (e.g. aluminum tris(acetylacetonate)), acetylacetone compounds of like titanium, zirconium, copper, cobalt, and zinc, and ammonia-coordinated compounds (e.g. polyamines);

oxazoline-group-containing compounds obtained from such as 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, 2-isopropenyl-5-methyl-2-oxazoline, 2-isopropenyl-5-ethyl-2-oxazoline, 2,2'-bis-(2-oxazoline), 2,2'-methylene-bis-(2-oxazoline), 2,2'-ethylene-bis-(2-oxazoline), 2,2'-trimethylene-bis-(2-oxazoline), 2,2'-tetramethylene-bis-(2-oxazoline), 2,2'-hexamethylene-bis-(2-oxazoline), 2,2'-octamethylene-bis-(2-oxazoline), 2,2'-ethylene-bis-(4,4'-dimethyl-2-oxazoline), 2,2'-p-phenylene-bis-(2-oxazoline), 2,2'-m-phenylene-bis-(4,4'-dimethyl-2-oxazoline), bis-(2-oxazolinylcychexane) sulfide, and bis-(2-oxazolinylnorbornane) sulfide;

isocyanate-group-containing compounds obtained from such as 2-methacryloyloxyethyl isocyanate (Karenz MOI, produced by Showa Denko Co.), methacryloyl isocyanate (MAI, produced by Nippon Paint Co., Ltd.), and m-isopropenyl-α,α-dimethylbenzyl isocyanate (m-TMI, produced by Takeda Chemical Industries, Ltd.);

aliphatic, alicyclic, or aromatic polyisocyanate compounds, such as trimethylene diisocyanate, 1,6-hexamethylene diisocyanate, (hydrogenated) tolylene diisocyanate, diphenylmethane diisocyanate, isophorone diisocyanate, and (hydrogenated) xylylene diisocyanate;

blocked isocyanate compounds obtained by making such as caprolactones (e.g. caprolactam), phenols (e.g. phenol), alcohols (e.g. tertiary alcohols), and oximes react with terminals of the above polyisocyanate compounds;

aminoplastoresins, such as methyl-etherated melamine resins, butyl-etherated melamine resins, hexamethoxymelamine resins, butyl-etherated benzoguanamine resins, butyl-etherated cyclohexylbenzoguanamine resins, and their water-solubilized products;

carbodiimide-group-containing compounds, such as Carbodirite V-02 (produced by Nisshin Boseki K.K.), Carbodirite V-04 (produced by Nisshin Boseki K.K.), Carbodirite V-06 (produced by Nisshin Boseki K.K.), Carbodirite E-01 (produced by Nisshin Boseki K.K.), and Carbodirite E-02 (produced by Nisshin Boseki K.K.);

polyamine compounds or amino-group-containing compounds, such as linear aliphatic polyamines (e.g. diethylenetriamine (DETA), triethylenetetramine (TETA), polyoxypropylenetriamine) and cyclic amines (e.g. menthenediamine, isophoronediamine, diaminodicyclohexylmethane, bis(aminomethyl)cyclohexane);

active-carbonyl-group-containing compounds obtained from such as acrolein, diacetone(meth)acrylamide, acetoacetoxyethyl (meth)acrylate, formylstyrol, and vinyl alkyl ketones having 4 to 7 carbon atoms (e.g. vinyl methyl ketone, vinyl ethyl ketone, vinyl butyl ketone);

silanol compounds obtained from such as mixtures or hydrolysis-condensation products of such as trialkoxysilanes (e.g. methyltrimethoxysilane, methyltriethoxysilane, ethyltrimethoxysilane, ethyltriethoxysilane, n-propyltrimethoxysilane, n-propyltriethoxysilane, i-propyltrimethoxysilane, i-propyltriethoxysilane, butyltrimethoxysilane, butyltriethoxysilane, pentyltrimethoxysilane, pentyltriethoxysilane, hexyltrimethoxysilane, hexyltriethoxysilane, heptyltrimethoxysilane, heptyltriethoxysilane, 2-ethylhexyltriethoxysilane, decyltrimethoxysilane, octadecyltriethoxysilane, γ-chloropropyltrimethoxysilane, γ-chloropropyltriethoxysilane, 3,3,3-trifluoropropyltrimethoxysilane, 3,3,3-trifluoropropyltriethoxysilane, γ-glycidoxypropyltrimethoxysilane, γ-glycidoxypropyltriethoxysilane, γ-methacryloxypropyltrimethoxysilane, γ-methacryloxypropyltriethoxysilane, γ-methacryloxypropyltri-i-propoxysilane, γ-mercaptopropyltrimethoxysilane, γ-mercaptopropyltriethoxysilane, vinyltrimethoxysilane, vinyltriethoxysilane, vinyltri-i-propoxysilane, phenyltrimethoxysilane, phenyltriethoxysilane, γ-aminopropyltrimethoxysilane, γ-aminopropyltriethoxysilane, γ-(aminoethyl)-aminopropyltrimethoxysilane, γ-(aminoethyl)-aminopropyltriethoxysilane, 3,4-epoxycyclohexylethyltrimethoxysilane, 3,4-epoxycyclohexylethyltriethoxysilane), dialkyldialkoxysilanes (e.g. dimethyldimethoxysilane, dimethyldiethoxysilane, diethyldimethoxysilane, diphenyldimethoxysilane, diphenyldiethoxysilane, phenylmethyldimethoxysilane), alkoxysilanes (e.g. AFP-1 (produced by Shinetsu Kagaku Kogyo K.K.), QP8-5314 (produced by TORAY-DOW CORNING SILICONE Corporation)), and diphenylsilanediol, SH-6018 (produced by TORAY-DOW CORNING SILICONE Corporation).

These crosslinking agents may be used either alone respectively or in combinations with each other.

The crosslinking agent is used favorably in an amount of 0.5 to 40 weight % in terms of solid content relative to the acrylic resin in the acrylic resin emulsion. In the case where the crosslinking agent is the aqueous resin, the crosslinking agent is used favorably in an amount of 0.5 to 30 weight % in terms of solid content relative to the acrylic resin in the acrylic resin emulsion.

Above all, in the case where the oxazoline-group-containing compound is used as an essential component of the crosslinking agent, the equivalent ratio of the oxazoline groups possessed by the oxazoline-group-containing compound to the carboxyl groups possessed by the acrylic resin in the acrylic resin emulsion is favorably in the range of 0.1 to 5, more favorably 0.25 to 3, still more favorably 0.5 to 2. In the case where the above equivalent ratio is less than 0.1, there is a possibility that the curing may be insufficient to obtain such as water resistance or durability of the coating film. In the case where the above equivalent ratio is more than 5, there is a possibility that the storage stability of the aqueous resin composition may be inferior.

(Other Constitutional Components)

The aqueous resin composition according to the present invention may optionally contain additives (which are publicly known in the corresponding field and do not spoil the object of the present invention) as other constitutional components besides the above essential constitutional components. Examples of the additives include: inorganic or organic fillers, pigments/dyes, ultraviolet absorbing agents, stabilizing agents, solvents, plasticizers, thickeners, dispersants, wetting agents, defoamers, antiseptics/mildew-proofing agents, anticorrosive agents, emulsifiers, pH-adjusting agents, and coalescent agents. For instance, examples of the fillers, used when using the aqueous resin composition according to the present invention as a coating, include transparent aggregates (e.g. feldspar, silica sand, silica stone, crystalline lime stone, glass beads, synthetic resin beads), color aggregates (e.g. marble powder, granite powder, serpentine powder, fluorite, colored silica sand powder, colored pottery powder), extenders (e.g. calcium carbonate, talc, barium sulfate, mica, clay, diatomaceous earth, barite, aluminum hydroxide), portland cement, and zinc oxide. Examples of the pigments/dyes include inorganic coloring pigments (e.g. carbon black, ferric oxide red, yellow iron oxide) and organic coloring pigments (e.g. quinacridone type pigments, phthalocyanine type pigments, β-naphthol type pigments, soluble azo pigments, insoluble azo pigments). In addition, examples of the ultraviolet absorbing agents include benzophenone type ultraviolet absorbing agents (e.g. 2,4-dihydroxybenzophenone), benzotriazole type ultraviolet absorbing agents (e.g. 2-(2'-hydroxy-5'-methylphenyl)benzotriazole), and triazine type ultraviolet absorbing agents. Examples of the stabilizing agents include (2,2,6,6-tetramethyl-4-piperidinyl) succinate and bis(2,2,6, 6-tetramethylpiperidinyl) sebacate. Incidentally, examples of the other additives include those which are publicly known in the corresponding field. These may be used either alone respectively or in combinations with each other.

(Aqueous Resin Composition)

As is aforementioned, the aqueous resin composition according to the present invention is a composition comprising the acrylic resin emulsion and the crosslinking agent as essential components. However, it is important that, when a coating film is formed from this aqueous resin composition, the formed coating film exhibits an elongation ratio (E (%)) that satisfies, along with the glass transition temperature ($Tg^T$ (° C.)) of the acrylic resin in the emulsion, the following expression:

$$2 \times Tg^T + E > 200.$$

The value of the "$2 \times Tg^T + E$" in the above expression is favorably not less than 205, more favorably not less than 210, still more favorably not less than 220. For the value of the "$2 \times Tg^T + E$" in the above expression to satisfy the above range makes it possible to: finish the resultant coating film into a still harder film and also into a coating film having sufficient flexibility; and thereby easily realize combining both properties of the blocking resistance and frost damage resistance of the coating film, which generally have trade-off relations with each other.

Hereupon, the elongation ratio (E (%)) of the coating film is a value calculated from a value given by measuring a coating film (thickness: 100 to 150 μm) (obtained by drying the aqueous resin composition) under an air atmosphere of 0° C. with a tensile tester and is, specifically, defined as a value determined by the test method and calculation method as described in the below-mentioned section headed "DETAILED DESCRIPTION OF THE PREFERRED EMBODIMENTS" hereof. The increase of the above elongation ratio indicates that a coating film which is more excellent in the flexibility can be obtained, and further that a coating film which is more excellent in the frost damage resistance can be obtained. As to the aqueous resin composition according to the present invention, the above elongation ratio is favorably not less than 40%, more favorably not less than 100%, still more favorably not less than 150%, although not limited.

The glass transition temperature ($Tg^T$ (° C.)) of the acrylic resin in the acrylic resin emulsion is as defined in the aforementioned description of the acrylic resin emulsion.

Furthermore, as to the aqueous resin composition according to the present invention, when a coating film is formed from this aqueous resin composition, the formed coating film favorably exhibits a blocking-resistant value (α) (hereinafter referred to as α value) of not less than 5.0 and a value (β) (hereinafter referred to as β value) of not less than 60 (which becomes more favorable in the following order: not less than 62; not less than 64; not less than 65; not less than 68; not less than 70; not less than 75), wherein the β value is calculated from the thermosoftening temperature (TMA (° C.)) of a dried material of the aqueous resin composition, the frost damage resistance (M (crackless limit number of cycles)) of the aforementioned coating film, and the aforementioned α value in accordance with the following expression:

$$TMA \cdot \alpha \cdot M / 1000.$$

The above β value is a value as an index of to what degree both properties of the blocking resistance and frost damage resistance of the coating film, which generally have trade-off relations with each other, are combined. The increase of its value indicates that both properties of the blocking resistance and frost damage resistance of the coating film become more excellent.

In this case, the coating film can be coated and formed by using such as brushes, spatulas, air sprays, airless sprays, applicators, roll coaters, bar coaters, curtain flow coaters, mortar guns, and lysine guns. The thickness of the coating film can be adjusted appropriately for such as the types of the acrylic resin and crosslinking agent being used, the type and amount of the medium being used, and environmental conditions, and is, for example, properly in the range of 1 to 200 μm, favorably 10 to 100 μm, as the film thickness after drying.

Hereupon, the α value of the coating film is a value as an index of the blocking resistance of the coating film and can be determined with consideration given to various parameters, for example, the drying temperature (T: ° C.) of the coating film, the load (L: g/cm$^2$) mounted on the coating film, the drying duration (t: minutes) of the coating film, and the temperature (TL: ° C.) during the loading. Specifically, the above value can be determined from a parameter given in the case where almost no damage, or no damage, to the surface of the coating film is seen when carrying out a process including the steps of: coating the aqueous resin composition according to the present invention onto a base material; and then drying the formed coating film at a predetermined temperature; and then applying a predetermined load to the resultant dried coating film at a predetermined temperature for a predetermined time in a way such that the load can be applied to a part of the coating film (e.g. a way that a weight is mounted on the coating film with such as gauze, thread, or air cap interposed between the weight and the coating film); and thereafter observing to what degree the surface of the coating film has been damaged. More specifically, there can be cited a method in which the above value is determined from a parameter given in the case where almost no damage, favorably no damage, to the surface of the coating film is seen when carrying out a process including the steps of: coating the coating film so as to have a thickness of 10 to 100 μm; and then drying the coated coating film in the temperature range of 50 to 150° C. for 5 to 30 minutes; and then mounting such as gauze (prescribed in the Japanese Pharmacopoeia) or air cap and a load of 50 to 250 g on the resultant dried coating film under an atmosphere of 30 to 80° C. for 5 to 30 minutes; and thereafter removing the load and such as gauze or air cap to observe to what degree the surface of the coating film has been damaged. Incidentally, the load is represented by the weight per unit area of the coating film. In addition, the above wording "almost no damage, or no damage, to the surface of the coating film is seen" means that the luster of the surface of the coating film does not change or that the appearance of the surface of the coating film does not change, and, more specifically, means that no mark of such as intersection points between fibers of the gauze or the air cap is seen on the surface of the coating film.

For example, the α value can be determined as the maximum value of the values calculated in accordance with the following calculation expression:

$$L \cdot TL/T \cdot t$$

(wherein: T represents the drying temperature (° C.) of the coating film, L represents the load (g/cm$^2$) mounted on the coating film, t represents the drying duration (minutes) of the coating film, and TL represents the temperature (° C.) during the loading, in the case where almost no damage, favorably no damage, to the surface of the coating film is seen).

However, the α value of the coating film, which is referred to in the present invention, is defined as a value determined by the test method and calculation method as described in the below-mentioned section headed "DETAILED DESCRIPTION OF THE PREFERRED EMBODIMENTS" hereof.

As to the α value, as this value becomes larger, the blocking resistance increases. Accordingly, this value is favorably not less than 5.0, and becomes more favorable in the following order: not less than 5.1; not less than 5.2; not less than 5.3; not less than 5.4; not less than 5.5; not less than 6.0; not less than 6.2; not less than 6.4; not less than 6.5.

The frost damage resistance (M) of the coating film can be indicated as the crackless limit number of cycles of the coating film in the case where the coating film is subjected to cycles between freezing and melting. The crackless limit number of cycles is favorably indicated as the maximum number of cycles during which the coating film does not crack. However, it may be indicated as a value given by observing the state of the coating film every 10, 20, 30, or 50 cycles. Examples of methods for subjecting the coating film to the cycles between freezing and melting include a method according to C666-97 as specified in the ASTM (American Society for Testing and Materials) standards. Specifically, the cycles between freezing and melting can be carried out under atmospheres such as "under air-under air", "under water-under water", or "under air-under water", having a temperature difference of 30 to 50° C., for 1 to 10 hours/cycle. More specific examples include a cycle of under air of –20° C. for 2 hours and under water of 20° C. for 2 hours (4 hours in total). Incidentally, the frost damage resistance of the coating film is favorably tested after the coating film has been brought into a state stabilized by such as being sufficiently dried to thus be fixed to a base material.

As to the above frost damage resistance, as its crackless limit number of cycles becomes larger, the frost damage resistance increases. Accordingly, the crackless limit number of cycles will do if it is not less than 150, and becomes more favorable in the following order: not less than 160; not less than 170; not less than 180; not less than 200; not less than 230; not less than 250.

The thermosoftening temperature (TMA (° C.)) of the dried material of the aqueous resin composition is given by processes publicly known in the corresponding field, for example, a process including the steps of: coating and then drying the aqueous resin composition to thereby form a dried coating film; and then applying a predetermined load to the surface of the coating film through a needle of a predetermined size; and then raising the atmosphere temperature at a predetermined rate, when measuring such as a temperature at which the needle becomes inserted into the coating film. Specifically, there are cited the following conditions: the thickness of the needle is in the range of 0.3 to 1.0 mm (diameter); the thickness of the coating film is in the range of 100 to 500 μm; the load is in the range of 10 to 50 g; and the temperature-raising rate is in the range of 1 to 10° C./minute. Incidentally, the measurement of the temperature at which the needle becomes inserted into the coating film can be carried out by various processes. Examples thereof include a process including the steps of: measuring a migration distance of the needle (distance of from the surface of the coating film to the tip end of the needle); and then drawing tangential lines from a curve-starting point and a curve-ending point on the maximum curve of a curved line which indicates the migration distance; and then calculating a intersection point between these tangential lines.

[Uses of Aqueous Resin Composition]

The aqueous resin composition according to the present invention can, for example, be used as a coating for building materials or an emulsion for building materials. Above all, it is particularly favorable as such as an industrial coating which is used in a coating step including a forcedly drying step in factories.

As is aforementioned, the coating film according to the present invention is a coating film formed from the above aqueous resin composition according to the present invention as a coating. Thus, due to the use of the specific aqueous resin composition, the coating film according to the present invention is a coating film which can have the aforementioned various properties. However, above all, it is particularly important that the coating film according to the present invention exhibits the α value (as the index of the blocking resistance) of not less than 5.0 and the β value of not less than 60, wherein the β value is calculated from the crackless limit number (M) of cycles (as the index of the frost damage resistance) of the coating film, the thermosoftening temperature (TMA (° C.)) of the dried material of the aqueous resin composition (used as the coating), and the aforementioned α value in accordance with the following expression:

$$TMA \cdot \alpha \cdot M/1000.$$

Hereupon, as to the various parameters in the above expression, the aforementioned descriptions can be applied thereto in the same way.

The coating film according to the present invention is, for example, obtained by coating the aqueous resin composition according to the present invention onto base materials such as slate boards, flexible boards, cement slag molded boards, cement slag shaped boards, hard wood chip cement boards, extrusion-molded cement boards, metal sheets, plastic sheets, ceramic boards, wood boards, and metallic parts steel sheets.

As is aforementioned, the building material according to the present invention is a material as a building material comprising a base material and the above coating film according to the present invention, wherein the base material has the coating film thereon. In other words, the building material according to the present invention is a material comprising the base material and the above coating film according to the present invention, wherein the base material is coated with the coating film.

The building material according to the present invention is, for example, usable as such as alkaline inorganic ceramic building materials and metallic building materials. As to the building material according to the present invention, the coating film according to the present invention is generally used as an overcoat layer. The coating film according to the present invention may be possessed directly on the base material, or at least one layer of coating film (e.g. sealer layer, intermediate coat layer) may lie between the coating film according to the present invention and the base material. Above all, there is preferred a mode such that: the base material has thereon the sealer layer and the intermediate coat layer in order and further thereon the coating film according to the present invention. Hereupon, as the sealer and the intermediate coating, there are used such as aqueous or solvent-base acrylic ones and polyesters, and they may be either thermosetting or thermoplastic types. In the cases of the thermosetting types, such as melamine and isocyanates are used as the crosslinking agents.

As to the coating film and building material according to the present invention, it is favorable that acrylic units are contained in the coating film along with oxazoline groups and/or amide ester bond units. This means that the above aqueous resin composition according to the present invention is used as a resin composition being a coating for forming the coating film or producing the building material.

(Effects and Advantages of the Invention)

When used as such as a coating, the aqueous resin composition according to the present invention which comprises the acrylic resin emulsion and the crosslinking agent as essential components makes it possible to: enhance the finished appearance and durability (e.g. water resistance) of the resultant coating film; and, particularly, combine both properties of the blocking resistance and frost damage resistance which have trade-off relations with each other; and finish the coating film into a still harder film; and further, enhance the durability of the coating film during cycles between low and high temperatures; and besides, obtain the durability of the coating film over a long period of time regardless of rapid temperature variation.

Particularly, if the acrylic resin in the acrylic resin emulsion includes two or more acrylic resins wherein at least two of these two or more acrylic resins have a glass transition temperature difference of not less than 30° C. between them and further if at least one of the above at least two acrylic resins having the glass transition temperature difference between them has a glass transition temperature of not lower than 80° C., then the above effects can more be increased.

In addition, if the crosslinking agent includes an oxazoline-group-containing compound as an essential component, then it becomes possible to more secure the above effects.

Furthermore, if the aqueous resin composition according to the present invention is used for a coating film or building material, then its application range can be increased, specifically, it can be utilized over a long period of time even under severe conditions, and it becomes possible to obtain a coating film or building material on which the reliability is still higher and of which the lifetime has been prolonged.

DETAILED DESCRIPTION OF THE PREFERRED EMBODIMENTS

Hereinafter, the aqueous resin composition according to the present invention and its uses are more specifically illustrated by the following Examples of some preferred embodiments. However, the present invention is not limited to these in any way. Incidentally, the "%" as hereinafter shown is based on the weight.

PRODUCTION EXAMPLE 1-1

Production of Acrylic Resin Emulsion

An amount of 76.8 g of deionized water was charged into a flask as equipped with a dropping funnel, a stirrer, a nitrogen-introducing tube, a thermometer, and a reflux condenser.

In addition, in the dropping funnel, there was prepared a first-step pre-emulsion from 4.0 g of a 25% aqueous solution of Aquaron HITENOL HS-10, 4.0 g of a 25% aqueous solution of Aquaron NOIGEN RN-20, 5.8 g of deionized water, 22.0 g of methyl methacrylate (Tg: 105° C.), 7.0 g of n-butyl methacrylate (Tg: 20° C.), and 1.0 g of acrylic acid (Tg: 95° C.). Of this pre-emulsion, 7.3 g corresponding to 5% of the total of the monomers was added into the flask, and then its contents were heated to 75° C. under stirring while nitrogen gas was made to slowly blow into them.

After the above heating, 6.0 g of a 5% aqueous potassium persulfate solution was added thereto to initiate polymerization. Then, the inside of the reaction system was heated to 80° C. and then kept at this temperature for 10 minutes. The reaction which had proceeded until this point of time was regarded as initial reaction.

After the end of the initial reaction, with the inside of the reaction system remaining kept at 80° C., the rest of the prepared first-step pre-emulsion was dropwise-added thereto uniformly over a period of 50 minutes. After this dropwise addition, the dropping funnel was washed with 5 g of deionized water, and a liquid resultant from this washing was added into the flask. Still thereafter, the inside of the reaction system was kept at the above temperature for 30 minutes, thus finishing the first-step polymerization.

Next, 0.9 g of 25% ammonia water was added thereto, and then the contents of the flask were stirred at the above temperature for 10 minutes. Subsequently, a second-step pre-emulsion, as prepared from 2.0 g of a 25% aqueous solution of Aquaron HITENOL HS-10, 2.0 g of a 25% aqueous solution of Aquaron NOIGEN RN-20, 23.2 g of deionized water, 26.0 g of 2-ethylhexyl acrylate (Tg: −70° C.), 22.0 g of methyl methacrylate (Tg: 105° C.), and 22.0 g of n-butyl methacrylate (Tg: 20° C.), was dropwise added thereto uniformly over a period of 130 minutes. After this dropwise addition, the dropping funnel was washed with 5 g of deionized water, and a liquid resultant from this washing was added into the flask. Still thereafter, the inside of the reaction system was kept at the above temperature for 30 minutes, thus finishing the second-step polymerization. The resultant reaction liquid was cooled to room temperature and then filtrated with a 100-mesh metal gauze, thus obtaining an acrylic resin emulsion (e1) having a solid content of 43.8%, a viscosity of 600 mPa·s, a pH of 9.0, and an MFT (minimum film formation temperature) of 30° C. Incidentally, the acrylic resin in the emulsion (e1) had a glass transition temperature (Tg) of 15° C.

Hereupon, the solid content of the acrylic resin emulsion was expressed in weight % given as the ratio of the weight of the residue after the drying to the weight before the drying when weighing out about 1 g of this emulsion and then drying it at 105° C. in a hot-air drying oven for 1 hour.

The viscosity of the acrylic resin emulsion was measured with a BM type viscometer (produced by Tokyo Keiki K.K.) at 25° C. for 30/minutes. When the viscosity was measured, the rotor was selected appropriately for the viscosity.

As to the pH of the acrylic resin emulsion, its value at 25° C. was measured with a pH meter (F-23: produced by Horiba Seisakusho K.K.).

The MFT of the acrylic resin emulsion was measured by coating the emulsion onto a glass plate (as put on a thermal gradient testing machine (product name: MFT Tester, produced by Tester Industries Co., Ltd.)) by an applicator of 0.2 mm and then heating (and, if necessary, cooling) the coated emulsion with the above testing machine to thereby dry the coated emulsion when checking, with the eye, whether a coating film was well formed without occurrence of such as cracking thereto. Specifically, such as the heating of the coating film with the above testing machine was carried out with a thermal gradient (temperature gradient) of 5° C. per interval of 4 cm in the temperature range of 10 to 60° C. or 50 to 100° C. Then, the minimum temperature of the temperatures of the well-film-formed portions was taken as the MFT (° C.).

PRODUCTION EXAMPLE 1-2

Production of Acrylic Resin Emulsion

An acrylic resin emulsion (e2) having a solid content of 43.9%, a viscosity of 320 mPa·s, a pH of 8.9, and an MFT of 40° C. was obtained in the same way as of Production Example 1-1 except that the methyl methacrylate as used in the first-step polymerization was replaced with cyclohexyl methacrylate, and that the 22.0 g of methyl methacrylate as used in the second-step polymerization was replaced with 20.0 g of cyclohexyl methacrylate (Tg: 83° C.), 1.0 g of 4-methacryloyloxy-2,2,6,6-pentamethylpiperidine (Tg: 130° C.), and 1.0 g of γ-methacryloxypropyltrimethoxysilane (Tg: 70° C.). Incidentally, the acrylic resin in the emulsion (e2) had a glass transition temperature (Tg) of 11° C.

PRODUCTION EXAMPLE 1-3

Production of Acrylic Resin Emulsion

An acrylic resin emulsion (e3) having a solid content of 43.7%, a viscosity of 720 mPa·s, a pH of 9.0, and an MFT of 35° C. was obtained in the same way as of Production Example 1-1 except that the 22.0 g of n-butyl methacrylate (Tg: 20° C.) as used in the second-step polymerization was replaced with 5 g of diacetoneacrylamide (Tg: 65° C.), 6 g of 2-hydroxyethyl methacrylate (Tg: 55° C.), and 11.0 g of n-butylmethyl methacrylate (Tg: 20° C.). Incidentally, the acrylic resin in the emulsion (e3) had a glass transition temperature (Tg) of 20° C.

PRODUCTION EXAMPLE 1-4

Production of Acrylic Resin Emulsion

An amount of 79.8 g of deionized water was charged into a flask as equipped with a dropping funnel, a stirrer, a nitrogen-introducing tube, a thermometer, and a reflux condenser.

In addition, in the dropping funnel, there was prepared a pre-emulsion from 6.0 g of a 25% aqueous solution of Aquaron HITENOL HS-10, 6.0 g of a 25% aqueous solution of Aquaron NOIGEN RN-20, 26.0 g of deionized water, 44.0 g of methyl methacrylate (Tg: 105° C.), 26.0 g of 2-ethylhexyl acrylate (Tg: −70° C.), 29.0 g of n-butyl methacrylate (Tg: 20° C.), and 1.0 g of acrylic acid (Tg: 95° C.). Of this pre-emulsion, 13.8 g corresponding to 10% of the total of the monomers was added into the flask, and then its contents were heated to 75° C. under stirring while nitrogen gas was made to slowly blow into them.

After the above heating, 6.0 g of a 5% aqueous potassium persulfate solution was added thereto to initiate polymerization. Then, the inside of the reaction system was heated to 80° C. and then kept at this temperature for 10 minutes. The reaction which had proceeded until this point of time was regarded as initial reaction.

After the end of the initial reaction, with the inside of the reaction system remaining kept at 80° C., the rest of the prepared pre-emulsion was dropwise added thereto uniformly over a period of 180 minutes. After this dropwise addition, the dropping funnel was washed with 10 g of deionized water, and a liquid resultant from this washing was added into the flask. Thereafter, the inside of the reaction system was kept at the above temperature for 30 minutes, and then the resultant reaction liquid was cooled to room temperature, and then 0.7 g of 25% ammonia water was added thereto. Subsequently, the resultant mixture was filtrated with a 100-mesh metal gauze, thus obtaining an acrylic resin emulsion (e4) having a solid content of 44.1%, a viscosity of 180 mPa·s, a pH of 9.2, and an MFT of 30° C. Incidentally, the acrylic resin in the emulsion (e4) had a glass transition temperature (Tg) of 16° C.

PRODUCTION EXAMPLE 1-5

Production of Acrylic Resin Emulsion

An acrylic resin emulsion (e5) having a solid content of 43.9%, a viscosity of 300 mPa·s, a pH of 9.1, and an MFT of 80° C. was obtained in the same way as of Production Example 1-1 except that, in the first-step polymerization, the amount of the n-butyl methacrylate as used was changed from 7.0 g to 2.0 g, and 5.0 g of cyclohexyl methacrylate was further used, and that, in the second-step polymerization, the amount of the 2-ethylhexyl acrylate (Tg: −70° C.) as used was changed from 26.0 g to 10.0 g, and the amount of the methyl methacrylate (Tg: 105° C.) as used was changed from 22.0 g to 33.0 g, and 5.0 g of cyclohexyl methacrylate was further used. Incidentally, the acrylic resin in the emulsion (e5) had a glass transition temperature (Tg) of 51° C.

PRODUCTION EXAMPLE 1-6

Production of Acrylic Resin Emulsion

An acrylic resin emulsion (e6) having a solid content of 43.8%, a viscosity of 450 mPa·s, a pH of 9.2, and an MFT of 95° C. was obtained in the same way as of Production Example 1-1 except that, in the first-step polymerization, the amount of the methyl methacrylate (Tg: 105° C.) as used was changed from 22.0 g to 29.0 g, and the n-butyl methacrylate (Tg: 20° C.) was replaced with 2.0 g of cyclohexyl methacrylate, and that, in the second-step polymerization, the amount of the methyl methacrylate (Tg: 105° C.) as used was changed from 22.0 g to 43.0 g, and the 2-ethylhexyl acrylate (Tg: −70° C.) was replaced with 3.0 g of cyclohexyl methacrylate. Incidentally, the acrylic resin in the emulsion (e6) had a glass transition temperature (Tg) of 80° C.

PRODUCTION EXAMPLE 2-1

Production of Oxazoline-group-containing Polymer

An amount of 92.1 g of propylene glycol monomethyl ether and 368.5 g of deionized water were charged into a flask as equipped with dropping funnels, a stirrer, a nitrogen-introducing tube, a thermometer, and a reflux condenser. The resultant mixture was heated to 80° C. while nitrogen gas was made to slowly flow through it.

Thereto, a monomer mixture and an initiator solution were dropwise added from their respective dropping funnels over a period of 120 minutes, wherein the monomer mixture had beforehand been prepared from 126 g of methyl methacrylate, 84 g of methoxypolyethylene glycol acrylate, and 210 g of 2-isopropenyl-2-oxazoline, and wherein the initiator solution had beforehand been prepared from 21 g of 2,2'-azobis(2-amidinopropane) dihydrochloride and 189 g of isopropyl alcohol. During the reaction, the nitrogen gas flowing was continued, and the inside temperature of the flask was kept at 80±1° C. After the end of the dropwise addition, this temperature was kept for 5 hours, and then the resultant reaction liquid was cooled to room temperature. Subsequently, the reaction liquid was filtrated with a 100-mesh metal gauze, thus obtaining an aqueous polymer solution (b1) having a solid content of 40.4%, a viscosity of 570 mPa·s, and a pH of 8.7.

PRODUCTION EXAMPLE 2-2

Production of Oxazoline-group-containing Polymer

An amount of 122.3 g of deionized water was charged into a flask as equipped with dropping funnels, a stirrer, a nitrogen-introducing tube, a thermometer, and a reflux condenser.

In addition, 20.2 g of a 15% aqueous solution of HITENOL N-08 was charged into the dropping funnel, and then the pH was adjusted to 9.0 with an appropriate amount of 25% ammonia water. The contents were heated to 70° C. while nitrogen gas was made to slowly flow through them. Thereafter, 10.0 g of a 5% aqueous potassium persulfate solution was added thereto. Subsequently, a monomer mixture was added thereto, and then the resultant mixture was dropwise added from the dropping funnel over a period of 180 minutes, wherein the monomer mixture had beforehand been prepared from 45 g of butyl acrylate, 45 g of styrene, and 10 g of 2-isopropenyl-2-oxazoline. After the end of the dropwise addition, the above temperature was kept for 60 minutes, and then the resultant reaction liquid was cooled to room temperature. Subsequently, the reaction liquid was filtrated with a 100-mesh metal gauze, thus obtaining a polymer emulsion (b2) having a solid content of 39.6%, a viscosity of 300 mPa·s, and a pH of 9.3.

PRODUCTION EXAMPLE 3-1

Production of High-Tg Acrylic Resin Emulsion

An amount of 96.0 g of deionized water was charged into a flask as equipped with a dropping funnel, a stirrer, a nitrogen-introducing tube, a thermometer, and a reflux condenser.

In addition, in the dropping funnel, there was prepared a pre-emulsion from 10.0 g of a 15% aqueous solution of HITENOL N-08, 6.0 g of a 25% aqueous solution of Nonipol 200, 29.0 g of deionized water, 90.0 g of methyl methacrylate (Tg: 105° C.), 3.5 g of 2-ethylhexyl acrylate (Tg: −70° C.), 5.0 g of ethyl acrylate (Tg: −22° C.), and 1.5 g of acrylic acid (Tg: 95° C.). Of this pre-emulsion, 14.1 g corresponding to 10% of the total of the monomers was added into the flask, and then its contents were heated to 75° C. under stirring while nitrogen gas was made to slowly blow into them.

After the above heating, 6.0 g of a 5% aqueous potassium persulfate solution was added thereto to initiate polymerization. Then, the inside of the reaction system was heated to 80° C. and then kept at this temperature for 10 minutes. The reaction which had proceeded until this point of time was regarded as initial reaction.

After the end of the initial reaction, with the inside of the reaction system remaining kept at 80° C., the rest of the prepared pre-emulsion was dropwise added thereto uniformly over a period of 180 minutes. After this dropwise addition, the dropping funnel was washed with 10 g of deionized water, and a liquid resultant from this washing was added into the flask. Thereafter, the inside of the reaction system was kept at the above temperature for 30 minutes, and then the resultant reaction liquid was cooled to room temperature, and then 1.1 g of 25% ammonia water was added thereto. Subsequently, the resultant mixture was filtrated with a 100-mesh metal gauze, thus obtaining an acrylic resin emulsion (c1) having a solid content of 40.1%, a viscosity of 100 mPa·s, and a pH of 9.3. Incidentally, the acrylic resin in the emulsion (c1) had a glass transition temperature (Tg) of 85° C.

PRODUCTION EXAMPLE 3-2

Production of High-Tg Acrylic Resin Emulsion

An acrylic resin emulsion (c2) having a solid content of 39.9%, a viscosity of 320 mPa·s, and a pH of 8.9 was obtained in the same way as of Production Example 3-1 except that the 90.0 g of methyl methacrylate (Tg: 105° C.), 3.5 g of 2-ethylhexyl acrylate (Tg: −70° C.), and 5.0 g of ethyl acrylate (Tg: −22° C.), as used, were replaced with 70.0 g of methyl methacrylate and 28.5 g of divinylbenzene. Incidentally, the acrylic resin in the emulsion (c2) had a glass transition temperature (Tg) of 115° C. However, this Tg is a value measured by differential scanning calorimetry (DSC) of a coating film formed from the acrylic resin (contained in the emulsion (c2)) alone.

EXAMPLES 1 TO 8 AND COMPARATIVE EXAMPLES 1 TO 2

The acrylic resin emulsions and the oxazoline-group-containing polymers (aqueous solutions or emulsions) (crosslinking agents) were blended together in the ratios, as shown in Table 1, and then stirred together for 30 minutes, thus obtaining aqueous resin compositions for evaluations.

The resultant aqueous resin compositions for evaluations were evaluated by the test methods as shown below. Their results are shown in Tables 1 and 2

<Test Methods>

Minimum Film Formation Temperature (MFT):

The MFT of the aqueous resin composition was measured by coating the composition onto a glass plate (as put on a thermal gradient testing machine (product name: MFT Tester, produced by Tester Industries Co., Ltd.)) by an applicator of 0.2 mm and then heating (and, if necessary, cooling) the coated composition with the above testing machine to thereby dry the coated composition when checking, with the eye, whether a coating film was well formed without occurrence of such as cracking thereto. Specifically, such as the heating of the coating film with the above testing machine was carried out with a thermal gradient (temperature gradient) of 5° C. per interval of 4 cm in the temperature range of 10 to 60° C. or 50 to 100° C. Then, the minimum temperature of the temperatures of the well-film-formed portions was taken as the MFT (° C.).

Blocking Resistance:

In the case where the aqueous resin composition for evaluations had an MFT of not lower than 0° C., a mixed solution of 2,2,4-trimethyl-1,3-pentanediol monoisobutyrate (CS-12: produced by Chisso) (as a coalescent agent) and butyl cellosolve in the ratio of 1/1 was added thereto so that the MFT of the composition would be near 0° C. Then, after not less than 1 day had passed, the composition was subjected to the test.

A solvent-base sealer (V Serane #200: produced by Dainippon Paint K.K.) was coated onto a slate board (Nozawa Flexible Sheet (JIS A-5403: asbestos slate): produced by Nozawa K.K.) by an air spray so as to have a weight of 20 g/m$^2$ after having been dried. Thereafter, a coating for forming a base coat layer was further coated by an applicator of 8 mil.

Incidentally, the coating for forming the base coat layer was prepared so as to have the following composition:

300 g of Acryset EX-35 (produced by Nippon Shokubai Co., Ltd.), 135 g of a white paste (note 1), 10 g of a black paste ("UNIRANT 88" produced by UNIRANT), 1.5 g of a defoamer ("Nopco 8034L" produced by San Nopco, Limited), 15 g of butyl cellosolve, and 15 g of 2,2,4-trimethyl-1,3-pentanediol monoisobutyrate ("CS-12" produced by Chisso) (as a coalescent agent).

(Note 1): The white paste was prepared by adding 500 weight parts of glass beads to the following components and then stirring them together by a homodisper at 3,000 min$^{-1}$ for 60 minutes. Hereupon, the above components were as follows:

60 g of a dispersant ("Demol EP" produced by Kao Corporation), 50 g of a dispersant ("Discoat N-14" produced by Dai-ichi Kogyo Seiyaku Co., Ltd.), 10 g of a wetting agent ("Emulgen 909" produced by Kao Corporation), 210 g of deionized water, 60 g of ethylene glycol, 1,000 g of titanium oxide ("CR-95" produced by Ishihara Sangyo Kaisha, Ltd.), and 10 g of a defoamer ("Nopco 8034L" produced by San Nopco, Limited).

After the above coating operation of the coating for forming the base coat layer, setting was carried out for 10 minutes, and then drying was carried out with a hot-air drying oven (produced by TABAI: drying temperature=100° C., wind speed=1 m/second) for 10 minutes. Thereafter, the aqueous resin composition for evaluations was further coated by an applicator of 4 mil and then dried with a hot-air drying oven (produced by TABAI: drying temperature=100° C., wind speed=1 m/second) for 10 minutes as it was without setting, whereby a test board was obtained. The resultant coating film (coating film formed from only the aqueous resin composition for evaluations) had a film thickness of 40 µm.

The test board, as got out of the drying oven, was left to cool for 90 seconds. Thereafter, gauze, a glass plate, and a weight (load mounted: 120 g/cm$^2$) were mounted in order on the test board, which was then immediately moved into a hot-air drying oven of a predetermined temperature (40–80° C.) to continue the mounted state for 10 minutes. Thereafter, the test board was cooled to not higher than 30° C., and then the gauze was peeled off to observe the appearance of the coating film of the test board.

As test conditions, the drying temperature (T: 100° C.) of the coating film, the load (L: 120 g/cm$^2$) mounted on the aforementioned coating film with the gauze interposed therebetween, and the drying duration (t: 10 minutes) of the coating film were fixed, and then only the temperature (TL) during the loading was changed by every 5° C. between 40° C. and 80° C. Then, each of all test conditions under which the marks of the intersection points of the gauze were unseen (test conditions as marked "○" in the below-mentioned evaluation) was substituted in the following expression:

$L \cdot TL/T \cdot t$ (wherein: T represents the drying temperature (° C.) of the coating film, L represents the load (g/cm$^2$) mounted on the coating film, t represents the drying duration (minutes) of the coating film, and TL represents the temperature (° C.) during the loading, in the case where almost no damage, favorably no damage, to the surface of the coating film is seen).

Then, the maximum value of the determined values was taken as the α value. The mounted load was calculated from "the weight (g) of the mounted weight/the surface area (cm$^2$) of the glass plate".

Evaluation: No marks of the intersection points of the gauze are seen: ○

Marks of the intersection points of the gauze clearly remain:△

Marks of the gauze remain in a mesh shape:×

Frost Damage Resistance:

Under the same conditions as of the test board as produced for the blocking resistance test, as mentioned above, the sealer and the base coat layer were coated and then dried. Subsequently, the aqueous resin composition for evaluations was coated by an applicator of 8 mil and then set for 10 minutes and then dried at 100° C. for 10 minutes. The resultant slate board was left at room temperature for 1 week, and then its sides and back were sealed with a solvent-base binary-liquid curing type acrylic resin, and then 1 day was left to pass. Thereafter, a frost damage resistance test was carried out with a freezing and melting tester (device name: MIT-1682, produced by Marui K.K.) in accordance with C666-97 of the ASTM standards.

Specifically, the freezing and melting were carried out under the freezing and melting conditions such that a cycle of at −20° C. for 2 hours (under air) and at 20° C. for 2 hours (under water) was repeated. Then, what number of cycles were repeated until the coating film on the slate board cracked was evaluated with a magnifying glass of 30 magnifications on the standard of every 50 cycles. Then, the evaluated number of cycles was indicated as the crackless limit number (M) of cycles.

Thermosoftening Temperature (TMA):

A mold frame was made of a material obtained by sticking a release paper on a glass plate with a double coated tape and then piling two packaging tapes (thickness: about 600 µm) on the release paper. An amount of 1 g of the aqueous resin composition for evaluations was cast into this mold frame and then dried in a hot-air drying oven of 100° C. for 1 hour. Immediately thereafter, the resultant dried material was measured by the softening temperature under a load of 20 g at a temperature-raising rate of 5° C./minute with a thermomechanical analyzer (TMA-50: produced by Shimadzu Corporation). Incidentally, the diameter of the needle as used was 500 µm, and the thermosoftening temperature (° C.) was defined as a temperature at a intersection point between a tangential line drawn from a curve-starting point and a tangential line drawn from a curve-ending point on the maximum curve of a curved line which indicated the migration distance of the needle.

β Value:

This value was calculated by doing multiplication among the above α value, the above crackless limit number of cycles (indicating the frost damage resistance), and the thermosoftening temperature and then dividing the resultant product by 1,000.

Warm Water Whitening Resistance:

Under the same conditions as of the test boards as produced for the frost damage resistance test and the blocking resistance test, as mentioned above, the sealer and the base coat layer were coated and then dried. Subsequently, the aqueous resin composition for evaluations was coated by an applicator of 4 mil and then set for 10 minutes and then dried at 100° C. for 10 minutes.

The resultant slate board was left at room temperature for 24 hours, and then its sides and back were sealed with a solvent-base binary-liquid curing type acrylic resin, and then the test board was left at room temperature for 1 week, and then an L value (L0) was measured with a color difference meter (device name: Spectroscopic Color Meter: SE-2000, produced by Nippon Denshoku Kogyo Co., Ltd.). Subsequently, the slate board was immersed into warm water of 60° C. After 24 hours had passed, the slate board was raised, and then water was lightly wiped off. Immediately thereafter, an L value (L1) was measured with the above color difference meter.

The value of a variation of the L value was calculated as $\Delta L=(L1)-(L0)$ to evaluate the warm water whitening resistance.

Elongation Ratio:

A release paper was stuck on a glass plate with a double coated tape, and then the aqueous resin composition for evaluations was coated onto the release paper so as to have a dried film thickness of 100 to 150 µm and then dried in a hot-air drying oven of 100° C. for 10 minutes and then left at room temperature for not less than 1 day. Thereafter, the resultant coating film (1 cm×3 cm) was peeled off from the release paper. This peeled coating film was measured by the elongation ratio under an air atmosphere of 0° C. with Autograph AGS-100D (produced by Shimadzu Corporation) in a way such that: the distance between standard lines before the test was set at 10 mm, and then the tensile test was carried out until the coating film fractured under conditions of tensile speed=5 mm/minute, thus measuring the elongation ratio (E (%)) with respect to the coating film just before the above fracture. Specifically, when the distance between standard lines of the coating film just before the above fracture was represented by $E^f$ (mm), the elongation ratio (E (%)) was defined as a value determined from the following equation:

Elongation ratio $(E(\%))=[(E^f-10)/10]\times 100$

EXAMPLE 9

The aqueous resin composition for evaluations, as obtained in the same way as of Example 1, was evaluated by the same as the aforementioned test methods except that the slate board was replaced with an extrusion-molded cement board (ASLOC: produced by Nozawa K.K.). Their results are shown in Table 2.

EXAMPLE 10

An amount of 10.3 g of an aqueous resin dispersion (prepared by blending 95 parts of the acrylic resin emulsion (e1) and 5 parts of the crosslinking agent (b1) together), 12.7 g of titanium oxide (R-780: produced by Ishihara Sangyo Kaisha, Ltd.), 12.7 g of calcium carbonate (NS#100: produced by Nitto Funka K.K.), 0.1 g of 25% monoethanolamine, 0.1 g of Nopco 8034L, 1.9 g of 5% Adekanol UH-420 (produced by Asahi Denka K.K.), 2.4 g of hydroxyethyl cellulose (SP-600: produced by Daicel Chemical Industries, Ltd.), and 58.8 g of water were blended together and then stirred by a homodisper at 2,000 min$^{-1}$ for 30 minutes, thus obtaining an aqueous resin composition for evaluations. The resultant aqueous resin composition for evaluations was evaluated by the same as the aforementioned test methods except that the aqueous resin composition for evaluations was coated, directly without coating the coating for forming the base coat layer, onto the slate board by a brush so as to have a weight of 20 g/m$^2$ after having been dried. Their results are shown in Table 2.

EXAMPLE 11

An amount of 46.2 g of an aqueous resin dispersion (prepared by blending 80 parts of the acrylic resin emulsion (e1), 5 parts of the crosslinking agent (b1), and 15 parts of the acrylic resin emulsion (c1) together), 0.3 g of 25% monoethanolamine, 0.2 g of Nopco 8034L, 8.0 g of 5% Adekanol UH-420 (produced by Asahi Denka K.K.), 10.2 g of hydroxyethyl cellulose (SP-600: produced by Daicel Chemical Industries, Ltd.), and 30.8 g of water were blended together and then stirred by a homodisper at 2,000 min$^{-1}$ for 30 minutes, thus obtaining an aqueous resin composition for evaluations. The resultant aqueous resin composition for evaluations was evaluated by the same as the aforementioned test methods except that the aqueous resin composition for evaluations was coated, directly without coating the coating for forming the base coat layer, onto the slate board by a brush so as to have a weight of 20 g/m$^2$ after having been dried. Their results are shown in Table 2.

TABLE 1

|  | Example 1 | Example 2 | Example 3 | Example 4 | Example 5 | Example 6 | Example 7 |
|---|---|---|---|---|---|---|---|
| ① Acrylic resin emulsion | (e1) | (e1) | (e2) | (e4) | (e3) | (e3) | (e5) |
| ② Crosslinking agent | (b2) | (b1) | (b1) | (b1) | A* | B** | (b1) |
| ③ High-Tg acrylic resin emulsion | — | (c1) | (c1) | (c2) | — | — | — |
| Blending ratio (weight ratio) ①/②/③ | 95/5/0 | 75/5/20 | 70/3/27 | 70/10/20 | 80/20/0 | 90/10/0 | 95/5/0 |
| $T_g^T$ (° C.) | 16 | 28 | 28 | 35 | 17 | 17 | 50 |
| Elongation ratio (%) | 200 | 160 | 150 | 140 | 175 | 170 | 110 |
| α value | 6.0 | 6.0 | 7.2 | 9.0 | 6.0 | 6.0 | 9.0 |
| Frost damage resistance (nmuber of cycles) | 150 | 300 | 300 | 250 | 150 | 150 | 200 |
| MFT (° C.) | 30 | 45 | 50 | 30 | 35 | 35 | 70 |
| TMA (° C.) | 80 | 80 | 85 | 80 | 75 | 70 | 80 |
| β value | 72 | 144 | 172 | 180 | 68 | 68 | 144 |

TABLE 1-continued

|  | Example 1 | Example 2 | Example 3 | Example 4 | Example 5 | Example 6 | Example 7 |
|---|---|---|---|---|---|---|---|
| Warm water whitening resistance ($\Delta L$) | 1.3 | 1.8 | 0.9 | 1.0 | 2.1 | 2.0 | 1.8 |

A*: 10% aqueous adipic dihydrazide solution
B**: Self-dispersing type polyisocyanate WB40–80D (produced by Asahi Kasei K.K.) was used in the form of a dispersion having a solid content of 50%.

TABLE 2

|  | Example 8 | Example 9 | Example 10 | Example 11 | Comparative Example 1 | Comparative Example 2 |
|---|---|---|---|---|---|---|
| ① Acrylic resin emulsion | (e6) | (e1) | (e1) | (e1) | (e4) | (e4) |
| ② Crosslinking agent | (b1) | (b2) | (b1) | (b1) | — | (b1) |
| ③ High-Tg acrylic resin emulsion | — | — | — | (c1) | (c1) | — |
| Blending ratio (weight ratio) ①/②/③ | 95/5/0 | 95/5/0 | 95/5/0 | 80/5/15 | 70/0/30 | 95/5/0 |
| $Tg^T$ (° C.) | 80 | 16 | 16 | 25 | 34 | 16 |
| Elongation ratio (%) | 50 | 200 | 170 | 185 | 90 | 120 |
| α value | 10.8 | 6.0 | 9.0 | 6.0 | 6.0 | 2.7 |
| Frost damage resistance (number of cycles) | 150 | 200 | 200 | 250 | 50 | 250 |
| MFT (° C.) | 90 | 50 | 50 | 40 | 50 | 20 |
| TMA (° C.) | 100 | 80 | 80 | 75 | 40 | 20 |
| β value | 162 | 96 | 144 | 113 | 12 | 14 |
| Warm water whitening resistance ($\Delta L$) | 2.1 | 1.2 | 0.1 | 1.7 | 8.3 | 10.1 |

INDUSTRIAL APPLICATION

The aqueous resin composition according to the present invention can, for example, favorably be used as a coating for building materials or an emulsion for building materials. Above all, it is particularly favorable as such as an industrial coating which is used in a coating step including a forcedly drying step in factories.

The coating film according to the present invention is, for example, favorable as a coating film for coating of surfaces of base materials used for such as building materials.

The building material according to the present invention is, for example, favorable as such as alkaline inorganic ceramic building materials and metallic building materials.

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. An aqueous resin composition, which is an aqueous resin composition comprising an acrylic resin emulsion and a crosslinking agent as essential components, wherein the acrylic resin in the acrylic resin emulsion is obtained by polymerizing at least one acrylic polymerizable monomer including at least one cycloalkyl (meth)acrylate having 4 to 20 carbon atoms as an essential component, wherein the polymerizable monomer is in the absence of an alkylcyclohexylalkyl ester of (meth)acrylic acid, and wherein the crosslinking agent includes an oxazoline-group-containing compound as an essential component; and
wherein, the acrylic resin is crosslinked by the oxazoline-group-containing compound during drying to form a coating film from the aqueous resin composition, and wherein the formed coating film exhibits an elongation ratio (E (%)) that satisfies, along with the glass transition temperature ($Tg_T$ (° C.)) of the acrylic resin in the emulsion, the following expression:

$$2 \times Tg^T + E > 200.$$

2. An aqueous resin composition according to claim 1, wherein the coating film exhibits:
a blocking-resistant value (α) of not less than 5.0; and
a value (β) of not less than 60, wherein the value (α) is calculated from the frost damage resistance (M) of the coating film, the thermosoftening temperature (TMA) of a dried material of the aqueous resin composition, and the blocking-resistant value (α) in accordance with the following expression:

$$TMA \cdot \alpha \cdot M/1000.$$

3. An aqueous resin composition according to claim 1, wherein the at least one acrylic polymerizable monomer further includes at least one alkyl (meth)acrylate having 1 to 20 carbon atoms.

4. An aqueous resin composition according to claim 1, wherein the acrylic resin in the emulsion includes two or more acrylic resins, wherein at least two of the two or more acrylic resins have a glass transition temperature difference of not less than 30° C. between them.

5. An aqueous resin composition according to claim 4, wherein at least one of the at least two acrylic resins having the glass transition temperature difference between them has a glass transition temperature of not lower than 80° C.

6. An aqueous resin composition according to claim 4, wherein the acrylic resin emulsion includes a multistep polymer emulsion obtained by carrying out emulsion polymerization of a monomer multistepwise in lots.

7. An aqueous resin composition, which is an aqueous resin composition comprising an acrylic resin emulsion and a crosslinking agent as essential components, wherein:
the acrylic resin in the emulsion includes two or more acrylic resins, wherein at least two of the two or more acrylic resins have a glass transition temperature difference of not less than 30° C. between them, and at least one of said acrylic resins is obtained by polymerizing a cycloalkyl (meth)acrylate having 4 to 20 carbon atoms, wherein the acrylic resins are obtained by a monomer component in the absence of an alkylcyclohexylalkyl ester of (meth)acrylic acid; and
the crosslinking agent includes an oxazoline-group-containing compound as an essential component for crosslinking the acrylic resins during drying of the emulsion.

8. An aqueous resin composition, which is an aqueous resin composition comprising an acrylic resin emulsion and a crosslinking agent as essential components, wherein:
the acrylic resin in the emulsion includes two or more acrylic resins, wherein at least two of the two or more acrylic resins have a glass transition temperature difference of not less than 30° C. between them, and at least one of said acrylic resins is obtained by polymerizing an alkyl (meth)acrylate having 1 to 20 carbon atoms, and at least one of said acrylic resins is obtained by polymerizing a cycloalkyl (meth)acrylate having 4 to 20 carbon atoms in the absence of an alkylcyclohexylalkyl ester of (meth)acrylic acid; and
the crosslinking agent includes an oxazoline-group-containing compound as an essential component for crosslinking the acrylic resins during drying of the emulsion.

9. An aqueous resin composition according to claim 1, wherein the cycloalkyl (meth)acrylate having 4 to 20 carbon atoms is a cycloalkyl (meth)acrylate having 6 to 10 carbon atoms.

10. An aqueous resin composition according to claim 1, wherein the cycloalkyl (meth)acrylate having 4 to 20 carbon atoms is cyclohexyl methacrylate.

11. An aqueous resin composition according to claim 7, wherein the cycloalkyl (meth)acrylate having 4 to 20 carbon atoms is a cycloalkyl (meth)acrylate having 6 to 10 carbon atoms.

12. An aqueous resin composition according to claim 7, wherein the cycloalkyl (meth)acrylate having 4 to 20 carbon atoms is cyclohexyl methacrylate.

13. An aqueous resin composition according to claim 8, wherein the cycloalkyl (meth)acrylate having 4 to 20 carbon atoms is a cycloalkyl (meth)acrylate having 6 to 10 carbon atoms.

14. An aqueous resin composition according to claim 8, wherein the cycloalkyl (meth)acrylate having 4 to 20 carbon atoms is cyclohexyl methacrylate.

15. An aqueous resin composition according to claim 3, wherein the alkyl (meth)acrylate having 1 to 20 carbon atoms is an alkyl (meth)acrylate having 4 to 10 carbon atoms.

16. An aqueous resin composition according to claim 8, wherein the alkyl (meth)acrylate having 1 to 20 carbon atoms is an alkyl (meth)acrylate having 4 to 10 carbon atoms.

17. An aqueous resin composition according to claim 7, wherein at least one of the at least two acrylic resins having the glass transition temperature difference between them has a glass transition temperature of not lower than 80° C.

18. An aqueous resin composition according to claim 8, wherein at least one of the at least two acrylic resins having the glass transition temperature difference between them has a glass transition temperature of not lower than 80° C.

19. An aqueous resin composition of claim 1, wherein said acrylic resin is obtained by polymerizing acrylic monomers, said acrylic monomers consisting essentially of alkyl (meth)acrylates having 1–20 carbon atoms and said cycloalkyl (meth)acrylates having 4–10 carbon atoms.

* * * * *